United States Patent
Gagnon et al.

[11] Patent Number: 5,971,432
[45] Date of Patent: Oct. 26, 1999

[54] SEAT OCCUPANT SENSING SYSTEM

[75] Inventors: Scott Darrell Gagnon, Plant City; Harald Snorre Husby, Lakeland, both of Fla.

[73] Assignee: Breed Automotive Technology, Inc., Lakeland, Fla.

[21] Appl. No.: 09/019,995

[22] Filed: Feb. 6, 1998

Related U.S. Application Data

[63] Continuation-in-part of application No. 08/801,928, Feb. 15, 1997, Pat. No. 5,810,392.

[51] Int. Cl.$^6$ .................................................. B60R 21/32
[52] U.S. Cl. ........................................ 280/735; 180/268
[58] Field of Search ............................ 280/735; 180/268

[56] References Cited

U.S. PATENT DOCUMENTS

| | | | |
|---|---|---|---|
| 3,874,474 | 4/1975 | Quantz | 180/268 |
| 4,361,741 | 11/1982 | Leskoverc et al. | 200/85 |
| 4,509,614 | 4/1985 | Bando et al. | 180/273 |
| 4,607,199 | 8/1986 | Krueger et al. | 318/484 |
| 4,633,237 | 12/1986 | Tuchnott et al. | 340/573 |
| 4,655,313 | 4/1987 | Hicks | 180/273 |
| 4,678,058 | 7/1987 | Wooters | 180/273 |
| 4,806,713 | 2/1989 | Krug et al. | 200/85 |
| 5,071,160 | 12/1991 | White et al. | 280/735 |
| 5,074,583 | 12/1991 | Fujita et al. | 280/735 |
| 5,109,945 | 5/1992 | Koga | 180/273 |
| 5,120,980 | 6/1992 | Fontaine | 307/16.1 |
| 5,161,820 | 11/1992 | Vollmer | 280/730 |
| 5,164,709 | 11/1992 | Lamberty et al. | 340/667 |
| 5,172,790 | 12/1992 | Ishikawa et al. | 280/735 |
| 5,232,243 | 8/1993 | Blackburn et al. | 280/732 |
| 5,413,378 | 5/1995 | Steffens, Jr. et al. | 280/735 |
| 5,439,249 | 8/1995 | Steffens, Jr. et al. | 280/735 |
| 5,454,591 | 10/1995 | Mazur et al. | 280/735 |
| 5,466,001 | 11/1995 | Gotomyo et al. | 280/730.1 |
| 5,474,327 | 12/1995 | Schousek | 280/735 |
| 5,481,078 | 1/1996 | Asche | 200/85 |
| 5,494,311 | 2/1996 | Blackburn et al. | 280/735 |
| 5,612,876 | 3/1997 | Zeidler et al. | 364/424 |

FOREIGN PATENT DOCUMENTS 0728636  8/1996  European Pat. Off. .

*Primary Examiner*—Kenneth R. Rice
*Attorney, Agent, or Firm*—L. R. Drayer

[57] ABSTRACT

An occupant weight sensing system has a seat pan which is rigidly mounted to a seat frame which attaches to a vehicle body. A seat cushion on which the occupant sits is positioned over the seat pan. A rigid frame is positioned above the seat pan and receives and supports the weight of the occupant. The rigid frame is supported on four sensors which in turn are mounted on the seat pan. The sensors collectively measure the weight supported by the rigid frame and thus determine the weight of the seat occupant. The sensors used to measure the weight of the seat occupant can be of two basic types. The first type is a load cell which experiences very little displacement and directly measures the imposed load. The second type of sensor employs a spring, the spring constant of which controls the amount of displacement for a given load. A Magnetoresistive Effect (GMR) displacement sensor measures the amount the spring is compressed.

40 Claims, 14 Drawing Sheets

SEAT OCCUPANT SENSING SYSTEM

RELATED APPLICATIONS

This application is a Continuation-in-Part of application Ser. No. 08/801,928 filed on Feb. 15, 1997, now U.S. Pat. No. 5,810,392, which is incorporated by reference herein.

FIELD OF THE INVENTION

The present invention relates to an apparatus for sensing the presence and weight of an occupant of a vehicle seat.

BACKGROUND OF THE INVENTION

Many vehicles are equipped with safety devices such as airbags and seat belt pretensioners to protect persons occupying various seats in the vehicle. If a seat is unoccupied or is occupied by a person of a particular size, it may not be necessary to activate a safety device associated with that seat. Furthermore, if a seat is occupied by a person of a particular size the manner in which a safety device is employed may be varied accordingly. One indicator of the seat occupant's size is the occupant's weight. In the case of an infant, the combined weight of the infant and an infant safety seat is useful as an indicator of occupant size. U.S. Pat. Nos. 5,232,243 and 5,494,311 teach a seat occupant sensor that is a piezoelectric film which is rigidly mounted to a substantially inflexible bottom portion of the seat. A plurality of sensing elements are arranged in rows and columns forming an array. U.S. Patent No. 5,454,591 teaches the use of this sensor to determine if a vehicle seat is occupied by an occupant weighing up to 40 pounds (about 18.2 kilograms) or more than 40 pounds (about 18.2 kilograms) and send an appropriate signal to a safety device control unit.

U.S. Pat. No. 5,474,327 teaches a seat occupant presence, weight and position sensor system wherein a plurality of sensors are located in the seat base just beneath the seat cover and some pressure is exerted on the sensors by the seat cover. The preferred sensors are mounted between polymer sheets and include a pair of conductive electrodes about 2.54 centimeters (1 inch) in diameter separated by carbon layers such that resistance between electrodes decreases as pressure increases.

U.S. Pat. No. 5,161,820 teaches a seat occupant sensor which is a switch, preferably a flat mat-like contact switch wherein two contact layers are separated by an intermediate, elastically deformable, electrically conductive layer. The contact switch is mechanically activated when the seat occupant compresses the intermediate layer and completes a conductive pathway for the switching circuit. The use of a simple physical contact switch or a condenser-type switch is also disclosed. However, the seat structure incorporating any of these switches is not shown in the drawings or described in the specification. The seat occupant sensor taught in this patent employs sensors located both in the seat and in the floor in front of the seat.

U.S. Pat. No. 4,678,058 teaches a vehicle seat switch assembly including a generally C-shaped spring located underneath the seat cushion. The end portions of the spring are displaced laterally when the spring is depressed when the seat is occupied. The lateral displacement of the spring ends pulls a switch plunger to close the switch.

U.S. Pat. Nos. 5,413,378 and 5,439,249 teach the use of an occupant weight sensor located in or on a structure that includes a seat cushion. The exact structure and operation of the occupant weight sensor is not disclosed in either of these patents. U.S. Pat. No. 5,466,001 teaches the use of sensors embedded in a seat cushion and seat back to sense occupant presence, but the structure of the sensors is not disclosed. U.S. Pat. No. 5,109,945 also teaches the use of a seat switch to detect a seat occupant but does not disclose the structure of the switch or the manner of incorporating the switch into the seat.

U.S. Pat. No. 5,481,078 teaches a seat occupant sensor wherein the seat rails pivot about their forward end against leaf springs designed to support the seat weight plus a known fraction of the occupant's weight so that the rear of the seat is raised when the seat is unoccupied. When the seat is occupied, the rear of the seat moves down and an electronic sensor detects seat position to provide a position signal.

U.S. Pat. Nos. 4,655,313; 4,361,741; and 4,509,614 also teach a vehicle seat switch used with a seat which pivots relative to the front of the seat cushion.

U.S. Pat. No. 5,120,980 teaches a foam seat cushion confining wire mesh electrical switch closing contacts. U.S. Pat. No. 5,164,709 teaches a seat occupant sensor which is a lateral-force-sensitive cable laid in a meandering pattern foamed into the seat cushion.

U.S. Pat. No. 4,806,713 teaches a seat-contact switch for generating a "seat occupied" signal when a seat suspension approaches a seat frame as a result of seat loading. An articulatable device is fastened on one end to the seat suspension and on the other end to the seat frame. U.S. Pat. No. 4,607,199 teaches the use of a seat switch in conjunction with a microprocessor to disable operation of a vehicle if the seat occupant is out of position for a given period of time. The switch structure and manner of incorporating the switch into the seat are not disclosed.

EP 0 728 636 A1 teaches the use of a switch sensor switch disposed in a seat base but does not disclose the switch structure and manner of incorporating the switch into the seat.

U.S. Pat. No. 4,633,237 teaches an occupant sensor for a hospital bed including a plurality of sensors defining interstices of a matrix of such sensors. The matrix is woven into a mat for placement on a bed in which a patient is confined.

SUMMARY OF THE INVENTION

A seat occupant sensing system for determining the weight of the seat occupant of this invention has a seat pan which is rigidly mounted to a seat frame which attaches to a vehicle body. A seat cushion on which the occupant sits is positioned over the seat pan. A rigid frame, or insert, is positioned above the seat pan and receives and supports the weight of the occupant. The rigid frame is supported on four sensors which in turn are mounted on the seat pan. The sensors collectively measure the weight supported by the rigid frame and thus determine the weight of the seat occupant. The sensors used to measure the weight of the seat occupant can be of two basic types.

The first type is a load cell which experiences very little displacement and directly measures the imposed load. Load cells typically employ strain gauges, piezoresistive, capacitive or piezoelectric sensors. The second type of sensor employs a spring, the springs have a spring constant which controls the amount of displacement for a given load. A displacement sensor measures the amount the spring is compressed which is used to determine the load on the spring. The displacement sensor of this invention will preferably employ a Giant Magnetoresistive Effect (GMR) Sensor.

There is provided in accordance with the present invention a seat occupant sensing system comprising: (a) a seat having a seat support member and a seat pan member fastened to one another; (b) a frame disposed vertically above the seat pan in a spaced apart vertically juxtaposed relationship with the seat pan, the frame underlying a portion of a seat cushion; and (c) at least two sensors interposed between the frame and the seat pan such that all of the force transferred from the frame to the seat pan is transferred via the sensors which sense the magnitude of the force transferred therethrough and send signals to a device which processes the signals to determine the weight that the portion of the seat cushion is bearing.

There is provided in accordance with yet another aspect of the present invention a seat occupant sensing system comprising: (a) a seat having a seat support member and a seat pan member fastened to one another; (b) a frame disposed vertically above the seat pan in a spaced apart vertically juxtaposed relationship with the seat pan, the frame underlying a portion of a seat cushion, the portion of the seat cushion being spaced apart from a rear edge of the seat cushion; and (c) at least two sensors interposed between the frame and the seat pan such that all of the force transferred from the frame to the seat pan is transferred via the sensors which sense the magnitude of the force transferred therethrough and send signals to a device which processes the signals to determine the weight of the load disposed on the portion of the seat cushion bearing on the sensor.

There is provided in accordance with yet another aspect of the present invention a seat occupant sensing system comprising: (a) a seat having a seat support member and a seat pan member fastened to one another; (b) a frame disposed vertically above the seat pan in a spaced apart vertically juxtaposed relationship with the seat pan, the frame underlying a portion of a seat cushion, the frame and the seat pan being at least partially retained in the vertically juxtaposed relationship by a tension member; (c) at least two sensors interposed between the frame and the seat pan such that all of the force transferred from the frame to the seat pan is transferred via the sensors which sense the magnitude of the force transferred therethrough and send signals to a device which processes the signals to determine the weight that the portion of the seat cushion is bearing; and (d) a controller which processes a signal from the weight determining device to control the activation of at least one safety device for an occupant of the seat based upon the weight.

There is provided in accordance with yet another aspect of the present invention a kit for retrofitting a vehicle seat with a seat occupant sensor system comprising a frame having a plurality of sensors mounted thereon in locations which correspond to a vertically uppermost surface of a vehicle seat pan and a device which processes signals from the systems to determine the weight that is located above and resting upon the frame.

Further objects, features and advantages of the invention will be apparent from the following detailed description when taken in conjunction with the accompanying drawings.

DESCRIPTION OF THE PREFERRED EMBODIMENTS

Figure 1:
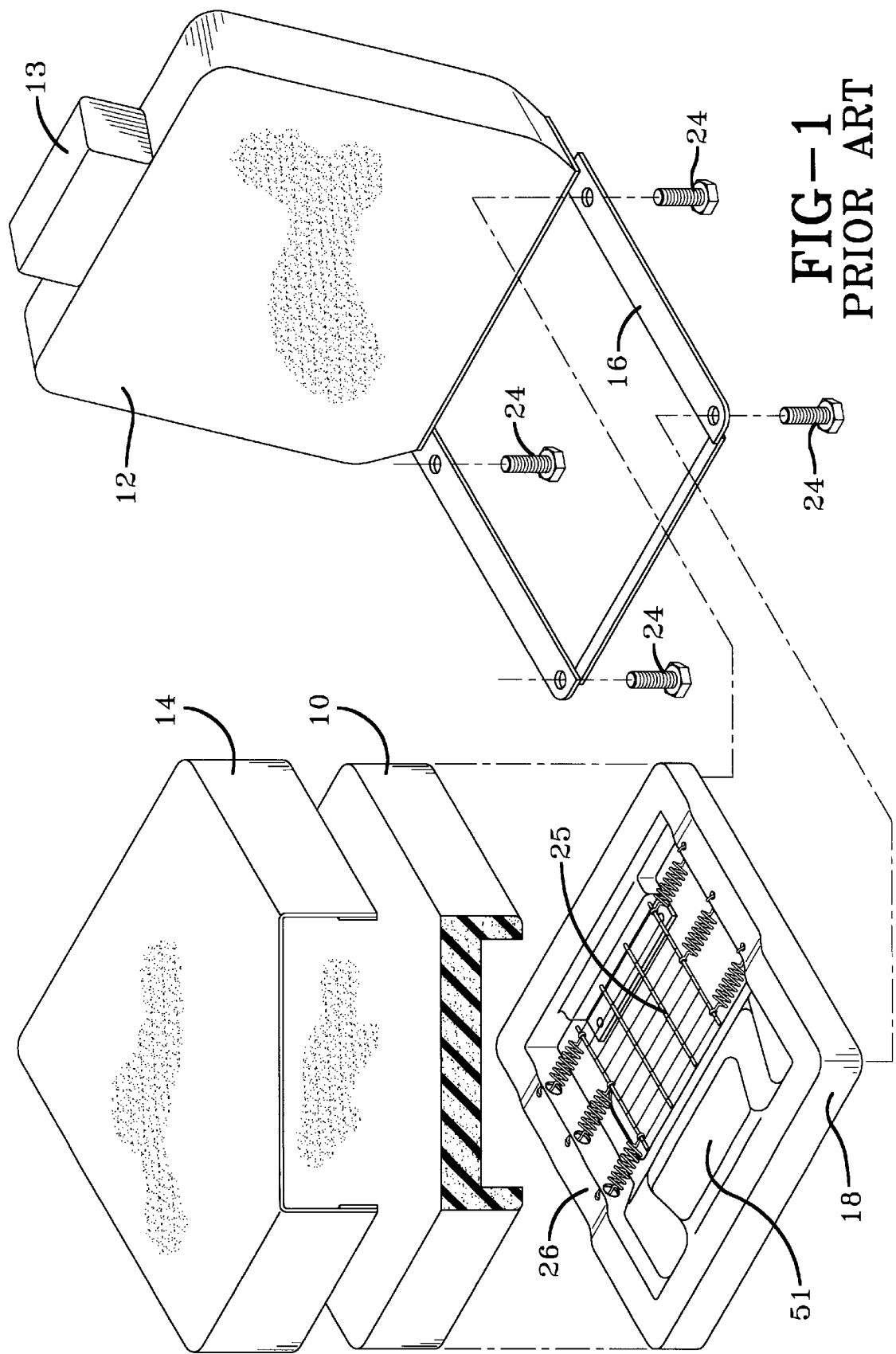
FIG. 1 is an exploded isometric view of a typical prior art vehicle seat.

Referring more particularly to FIGS. 1–18, wherein like numbers refer to similar parts, in FIG. 1 there is shown an exploded view of a typical prior art vehicle seat. A vehicle seat has a seat cushion 10 and a seat back 12. The seat back may have a head rest 13 associated therewith. The seat back may be pivotally attached to the remainder of the seat. The seat cushion 10 is made of a comfortable, supportive but compressible material, for example foam rubber. The seat has a rigid seat support member 16, sometimes referred to as the seat frame. The rigid seat support member may be unitary, as shown in FIG. 1, with a cross member extending between two side rails, or the side rails may only be joined to one another by the seat back and maintained parallel to one another by fastening the seat frame to legs which extend between the seat frame and the floor of the vehicle.

Figure 2:
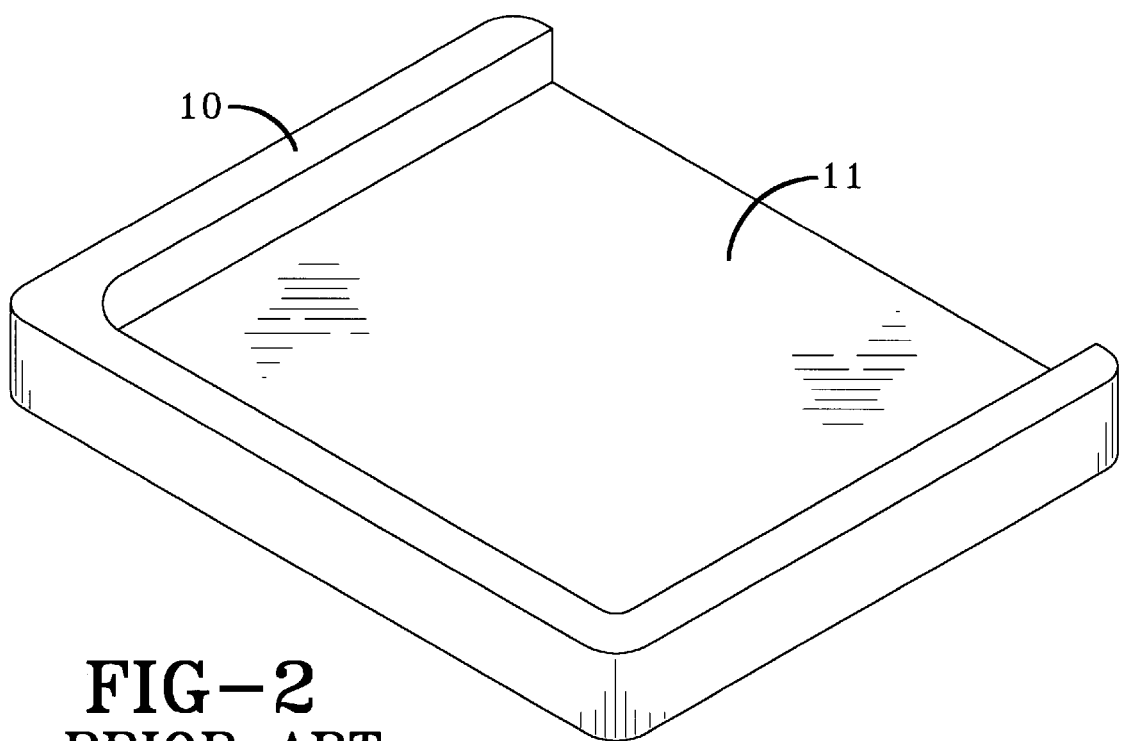
FIG. 2 is a perspective view of the bottom side of a prior art seat cushion used with the prior art seat shown in FIG. 1.
Figure 3:
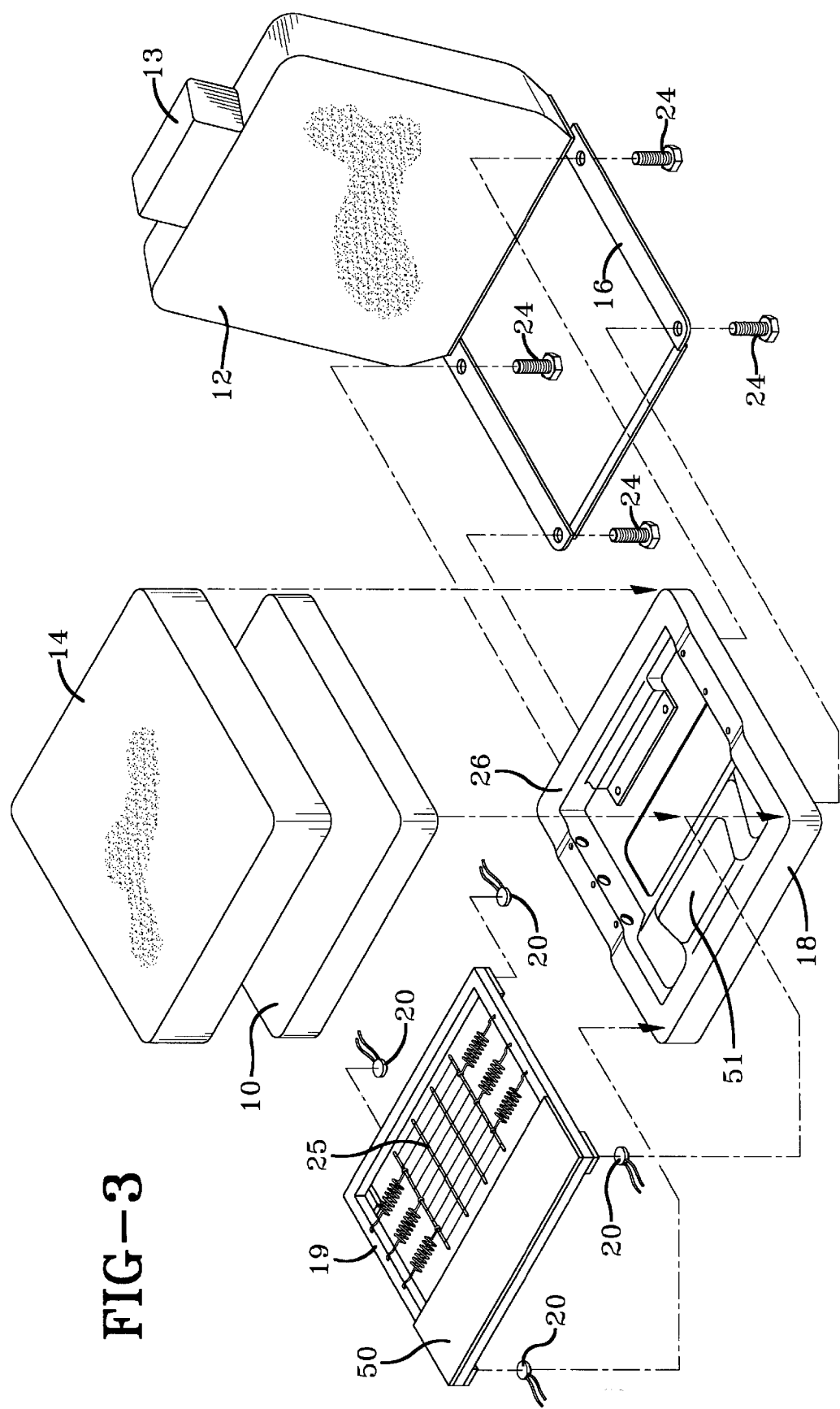
FIG. 3 is an exploded isometric view of a vehicle seat equipped with an occupant sensing apparatus in accordance with the present invention.

A seat pan 18 supports the seat cushion 10, which is adapted to be secured thereto by having a bottom side 11 that is contoured, as shown in FIG. 2, to be complementary to the seat pan 18. The seat pan has a generally rectangular shape which may be adapted to the design of a particular seat cushion and seat frame. As shown in FIG. 1, the perimeter of the seat pan is bent to form peripheral walls which may, or may not, have a second horizontal portion associated therewith. A supportive cushioning elastic structure 25 comprising springs and straps, or any other suitable support members, extends across the opening in the seat pan 18 to provide support for the seat cushion 10.

The seat frame 16 and the seat pan 18 are fastened to one another in a vertically juxtaposed relationship. In this example the means for fastening the rigid seat support member and the seat pan 18 to one another are a plurality of threaded fasteners 24. The threaded fasteners do not extend through the uppermost surface 26 of the seat pan, but rather are attached to the seat pan in depressions located in the upper surface of the seat pan or attach to a lower horizontally extending portion of the seat pan. The upholstery 14 is a sheet material which overlies the seat cushion 10 and is secured to the seat pan 18. Examples of sheet materials used as upholstery are fabrics, vinyls and leathers.

Referring next to FIGS. 3 to 6, there are shown exploded, front elevation, side elevation and top views, respectively, of a vehicle seat equipped with an occupant sensing apparatus in accordance with the present invention. Of course it is understood that the design of various structural components of a vehicle seat can vary from one make and model of vehicle to another, with the vehicle seat shown being merely exemplary of a vehicle seat that may be employed in the practice of the present invention. The present invention does, however, apply to seats in general and may be employed not only with vehicle seats but also any seat where it is desired to ascertain whether or not the seat is occupied and the weight of a seat occupant.

Figure 5:
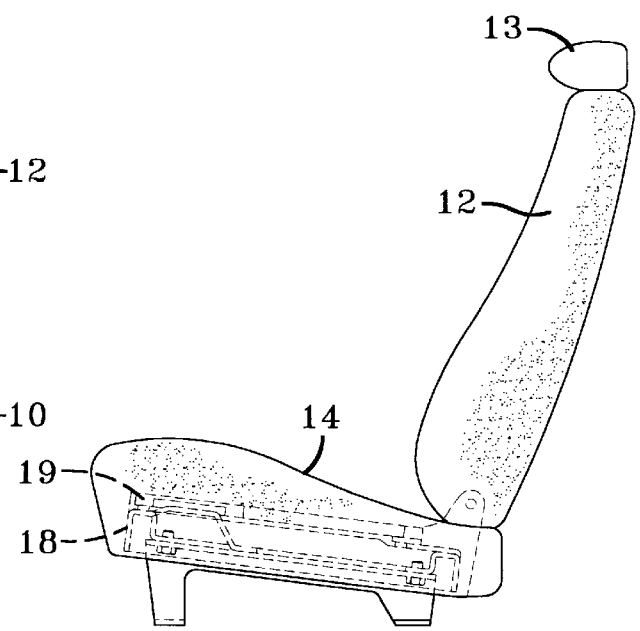
FIG. 5 is a side elevation view of the vehicle seat equipped with an occupant sensing apparatus of FIG. 4.

As in the prior art, the vehicle seat has a seat cushion 10 and a seat back 12. The seat back may have a head rest 13 associated therewith. The seat back may be pivotally attached to the remainder of the seat, as best seen in FIG. 5. As in the prior art the seat cushion 10 is made of a comfortable, supportive but compressible material, for example foam rubber. The seat frame 16 is substantially like the prior art seat frame described above with reference to FIG. 1.

The seat pan 18 which supports the seat cushion 10 is substantially like the seat pan described above with respect to FIG. 1 and is attached to the seat frame 16 using threaded fasteners 24 in substantially the same manner as described above. The upholstery 14, as in the prior art, is a sheet material overlying the seat cushion 10 and secured to the seat pan 18. An advantage of the seat occupant sensing system of the present invention is that this system may be retrofitted to a prior art vehicle seat.

Figure 7A:
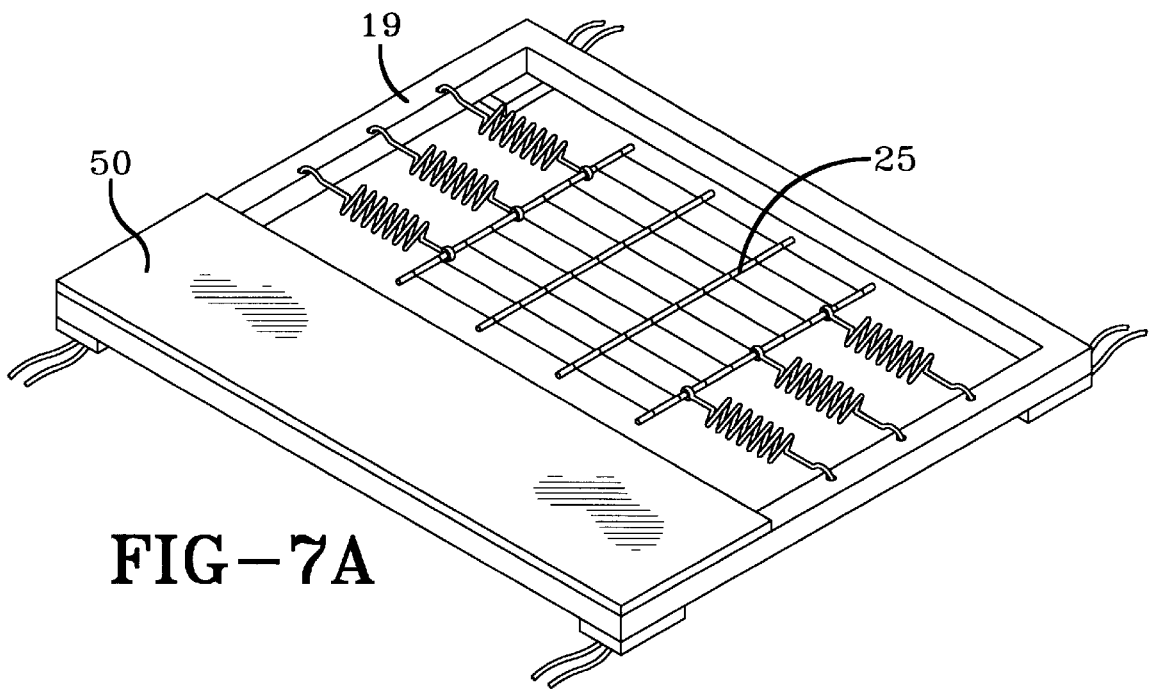
FIG. 7A is a perspective view of the top side of a frame with sensors mounted thereon.
Figure 7B:
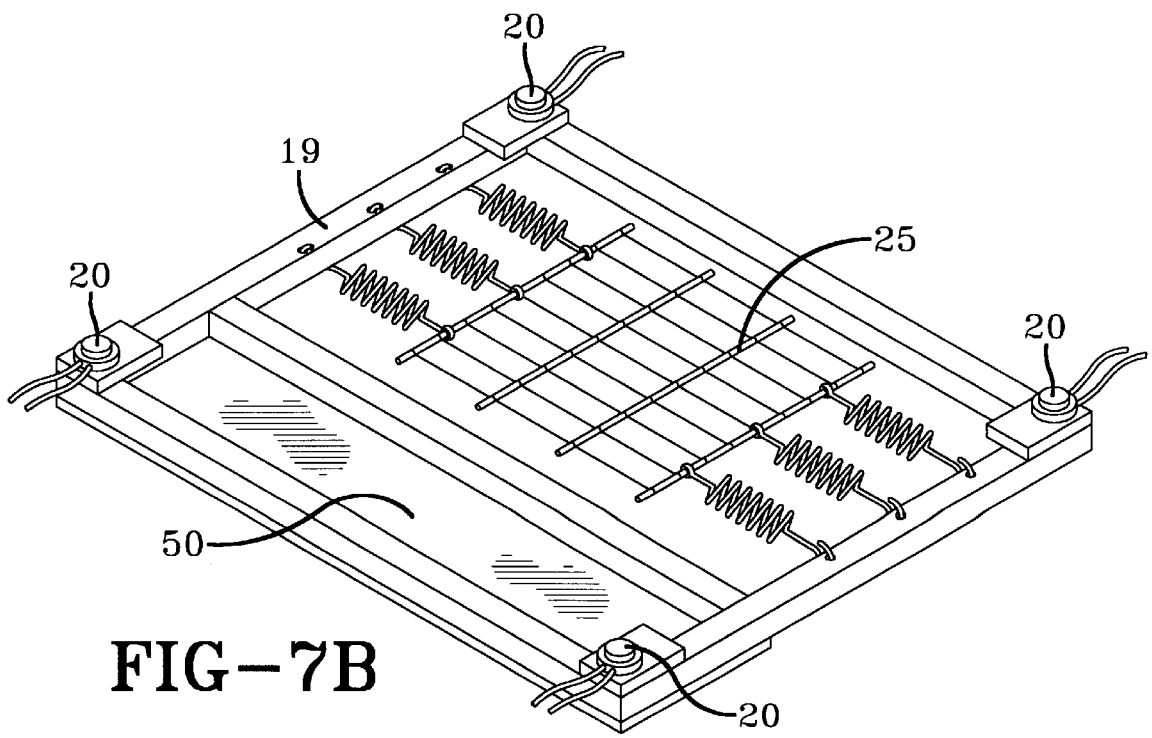
FIG. 7B is a perspective view of the bottom side the frame with sensors mounted thereon of FIG. 7A.

A seat occupant sensing system of the present invention has a seat pan 18 with a rigid member 19 disposed vertically above the seat pan in a spaced apart vertically juxtaposed relationship with the seat pan. Referring next to FIGS. 7A and 7B there are shown perspective views of the top side and bottom side, respectively, of a frame 19 with sensors 20 mounted thereon. In the embodiment illustrated in FIGS. 7A and 7B the rigid member 19 is a frame which has a generally rectangular shape and a sensor 20 is located in the vicinity of each corner of the frame. The supportive cushioning elastic structure 25 comprising springs and straps, or any other suitable support members, which in the prior art extends across the opening in the seat pan 18 to provide support for the seat cushion 10 instead extends across the frame 19. This feature prevents the springs from contacting both the seat pan and the frame, therefore potentially transferring forces from the frame to the seat pan.

Figure 6:
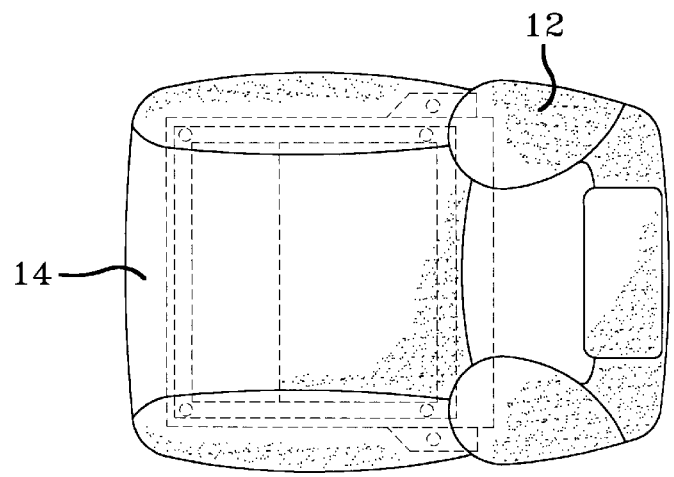
FIG. 6 is a top view of the vehicle seat equipped with an occupant sensing apparatus of FIG. 4.
Figure 8:
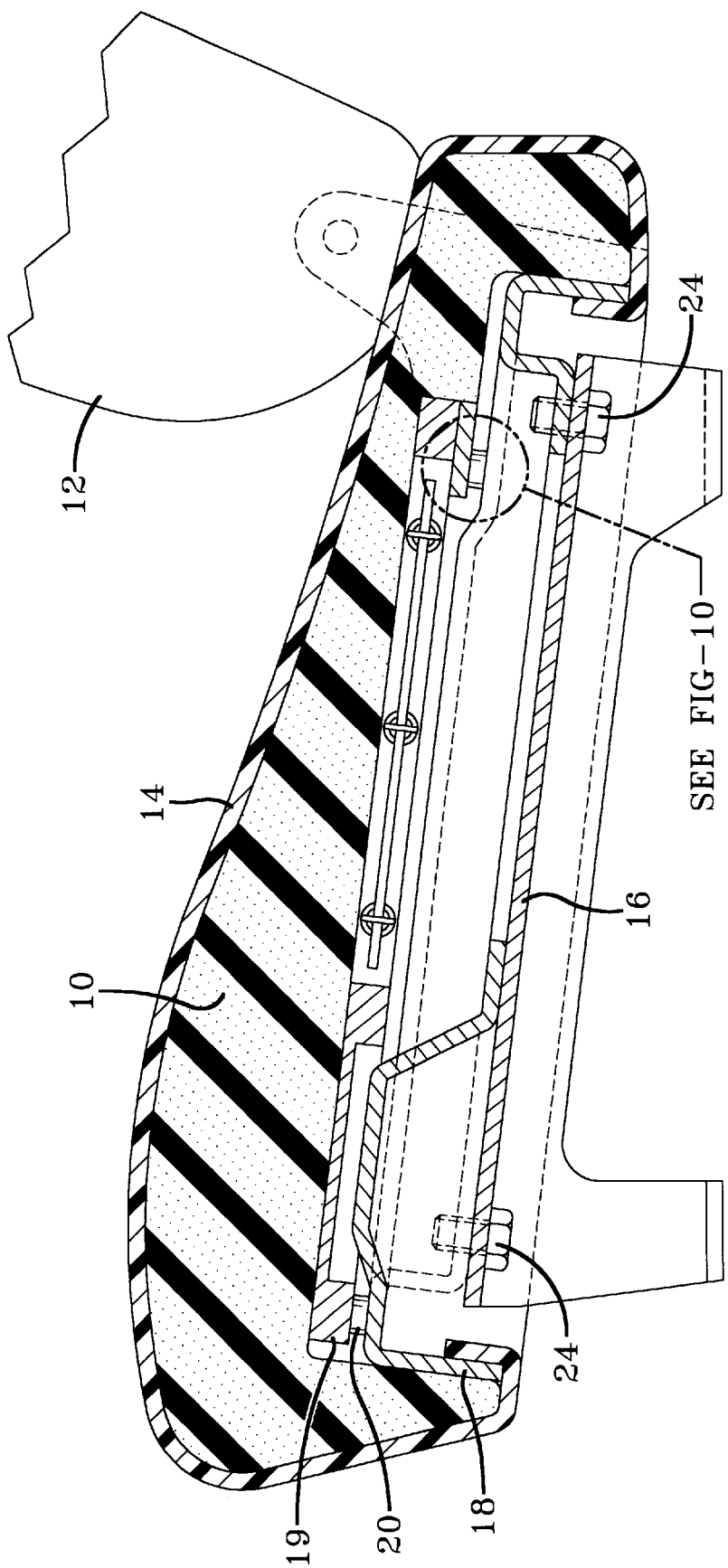
FIG. 8 is a cross-sectional side view of the vehicle seat equipped with an occupant sensing apparatus of FIG. 4 taken along section line 8—8.

As shown in FIGS. 5, 6 and 8 the rigid member 19 underlies a portion of the seat cushion 10 and may be made of any suitable material such as steel or aluminum. In the embodiment shown, the frame 19 includes a plate 50 which is located to be complementary to the anti-submarining portion 51 of the seat pan 18. The anti-submarining portion of a seat pan restricts the tendency of a belted seat occupant to slide forward during a rapid deceleration of the vehicle.

At least two sensors 20 are interposed between the rigid member 19, or frame, and the seat pan 18 such that all of the force transferred from the rigid member to the seat pan is transferred via the sensors. The sensors sense the magnitude of the force transferred therethrough and send signals to a device (not shown) which processes the signals to determine the weight that the portion of the seat cushion which the rigid member 19 underlies is bearing. Each sensor 20 may be, for example, a strain gauge, a load cell or a variable resistance pressure sensor.

A working prototype of a vehicle seat equipped with an occupant sensing apparatus in accordance with the present invention employed four sensors which were Model 14 compression-only subminiature load cells purchased from Sensotec, Inc. of 1200 Chesapeake Avenue, Columbus, Ohio U.S.A. These sensors had a range of either 45.4 kilograms (100 pounds) or 113.5 kilograms (250 pounds) and a seat could be equipped with only one size sensor or a combination of sizes. For example, 113.5 kilogram sensors could be used towards the front of the seat and 45.4 kilogram sensors could be used towards the rear of the seat. The height of these sensors is 3.8 millimeters (0.15 inch). If desired, at least one of the sensors may be one type of sensor, while the other sensor(s) may be another type of sensor.

If the surface of the rigid member 19 which is proximal to a sensor 20 is not substantially flat, it is desirable with these commercially available sensors to place a shim of some sort between the sensor and the rigid member to improve the transfer of forces from the rigid member to the sensor. The installation of the seat occupant sensing system into the seat is preferably facilitated by securing the sensors in place on the rigid member (frame) and thereafter placing the resultant assembly in a vertically juxtaposed relationship with the seat pan, with the sensors resting on the vertically uppermost surface of the seat pan 18.

Figure 10:
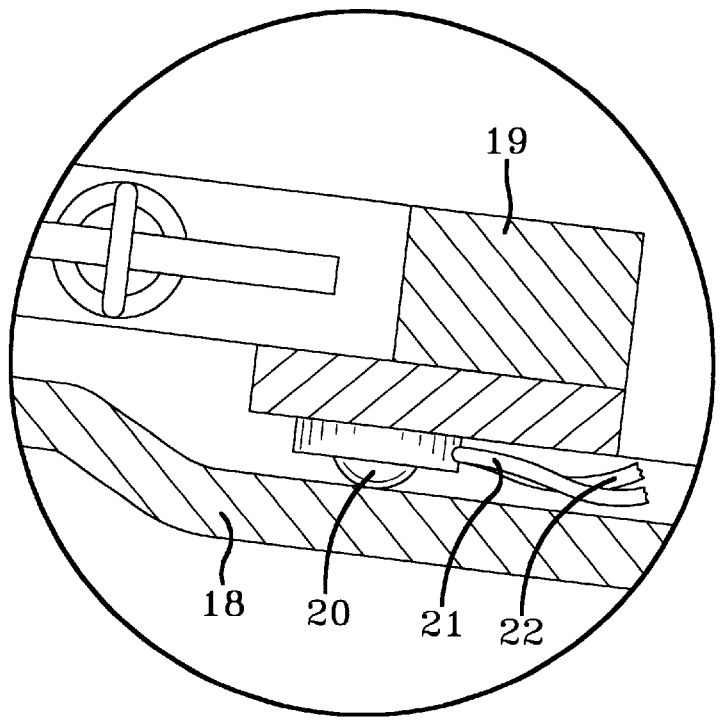
FIG. 10 is an enlarged fragmentary view of a sensor located between rigid components of a vehicle seat equipped with an occupant sensing apparatus in accordance with the present invention.

As shown in FIG. 10, which is an enlarged fragmentary view, at the location indicated in FIG. 8, of a sensor 20 located between the rigid member 19 and the seat pan 18, each sensor has a plurality of electrical leads 21,22 extending therefrom for communicating with a device (not shown) which processes the signals to determine the weight that the portion of the seat cushion which the rigid member underlies is bearing. The vertically spaced apart relationship of the rigid member 19 (frame) and the seat pan 18 is illustrated very well in FIG. 10. The distance that the rigid member (frame) is spaced apart from the seat pan 18 is the height of the sensor disposed therebetween.

Figure 4:
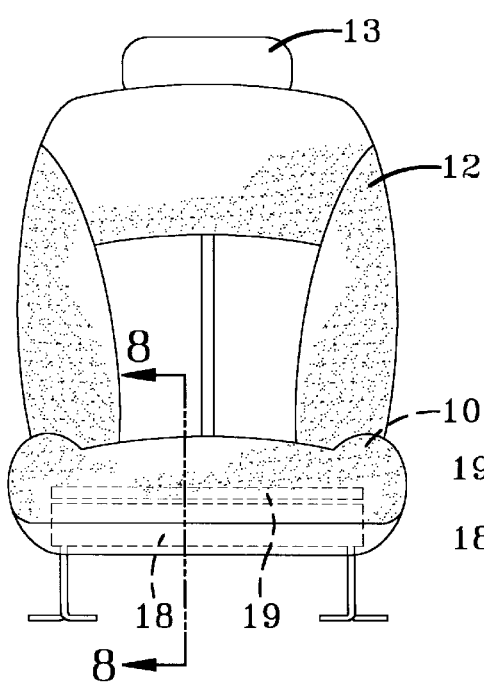
FIG. 4 is a front elevation view of a vehicle seat equipped with an occupant sensing apparatus in accordance with the present invention.

As shown in FIG. 8, which is a cross-sectional side view, taken along line 8—8 of FIG. 4, the portion of the seat cushion 10 which the rigid member 19 underlies is preferably spaced apart from a rear edge of the seat cushion. This feature minimizes the sensing of forces which are transferred from the seat back to the seat pan 18 via the sensors. This is important in the instance where a person seated in the rear seat of an automobile leans against the back of the front seat and could influence the forces transferred to the seat pan. It has been demonstrated that the seat occupant sensing system of the present invention is capable of determining the presence and weight of a seat occupant with good accuracy.

The rigid member 19 and the seat pan 18 are at least partially retained in the vertically juxtaposed relationship by a tension member. In the embodiment shown in the drawings the tension member is a sheet material 14 overlying the seat cushion 10 and secured to the seat pan 18. The sheet material is commonly referred to as the seat cover or upholstery. As shown in FIG. 8 the perimeter of the sheet material may have clips or a deformable strip associated therewith which can clip onto or be bent around an edge of the seat pan.

Figure 9:
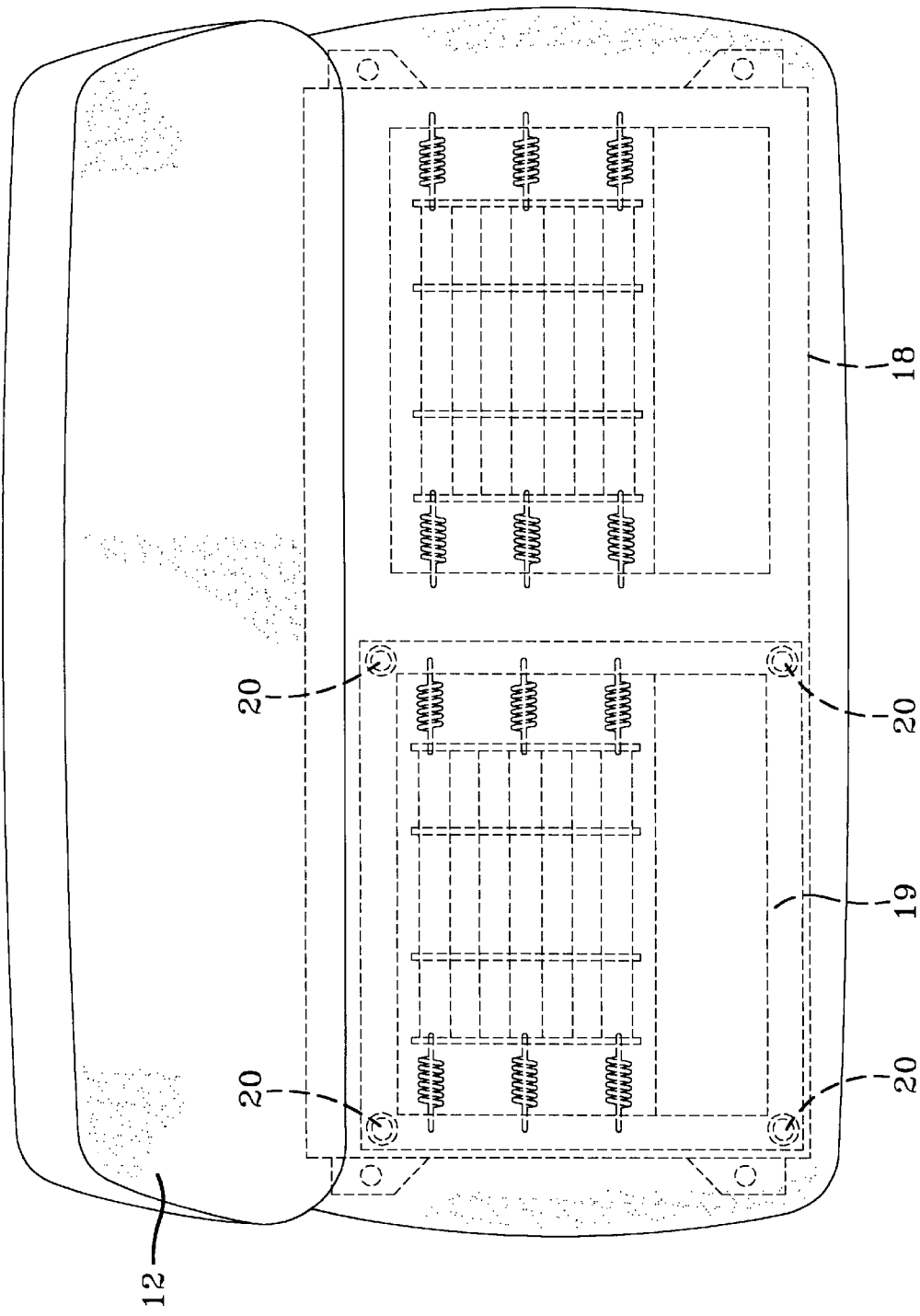
FIG. 9 is a top view of a vehicle bench type vehicle seat equipped with an occupant sensing apparatus in accordance with the present invention.

Referring next to FIG. 9 there is shown a top view of a vehicle bench type seat equipped with an occupant sensing apparatus employing a rigid member 19 and sensors 20 in accordance with the present invention. If it is desired to determine the presence and size of an occupant of the passenger side of a front bench seat of a vehicle, the occupant sensing system of the present invention may be incorporated into only the passenger side of the bench seat as illustrated in FIG. 9.

Figure 11:
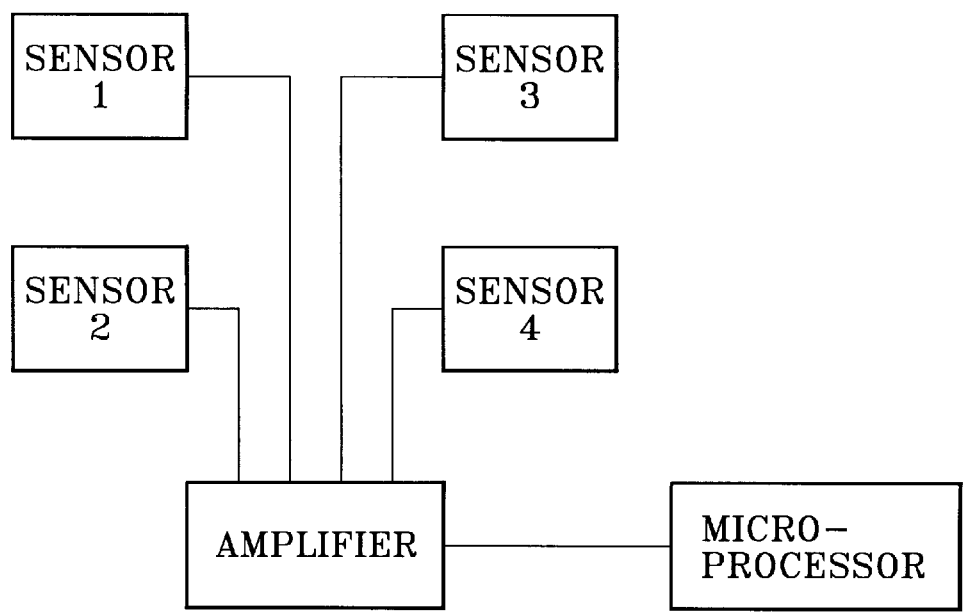
FIG. 11 is a schematic view of an occupant sensing apparatus in accordance with the present invention.

Referring next to FIG. 11 there is shown a schematic view of an occupant sensing apparatus in accordance with the present invention. A signal from each sensor is passed through an amplifier to a device, such as a microprocessor which processes the signal, or signals, to determine the weight that the rigid seat pan member is bearing. Algorithms to translate a signal to a weight are well known and are used for example in electronic bathroom scales. The algorithm must take into account the weight of the seat cushion and the rigid seat pan member in determining the weight of the seat occupant. Of course if the weight of the seat occupant is determined to be zero, the seat is unoccupied.

There is a need in the field of inflatable vehicle occupant restraints, such as air bags, to determine if the occupant of the front passenger seat of a motor vehicle equipped with a front passengerside air bag is an infant in an infant seat or a small child weighing less than a preselected amount. This weight determining device, such as a microprocessor, determines the weight that the rigid seat pan is bearing and is preferably a controller which controls the activation of at least one safety device for an occupant of the seat based upon the occupant's weight. The controller controls, for example, the activation of an inflatable vehicle occupant restraint or a seat belt pretensioner. Additionally the controller may control the manner in which an activated safety device operates, for example controlling the speed at which an airbag is inflated or the amount of seat belt slack which is to be taken up by the pretensioner. Thus, the seat occupant sensing system disclosed herein may determine the presence or absence of an object or person on a seat cushion, and if present, the weight of the person or object on the seat cushion. Based upon these determinations, the device may activate one or more safety devices, and/or control the manner in which an activated safety device operates.

Figure 12:
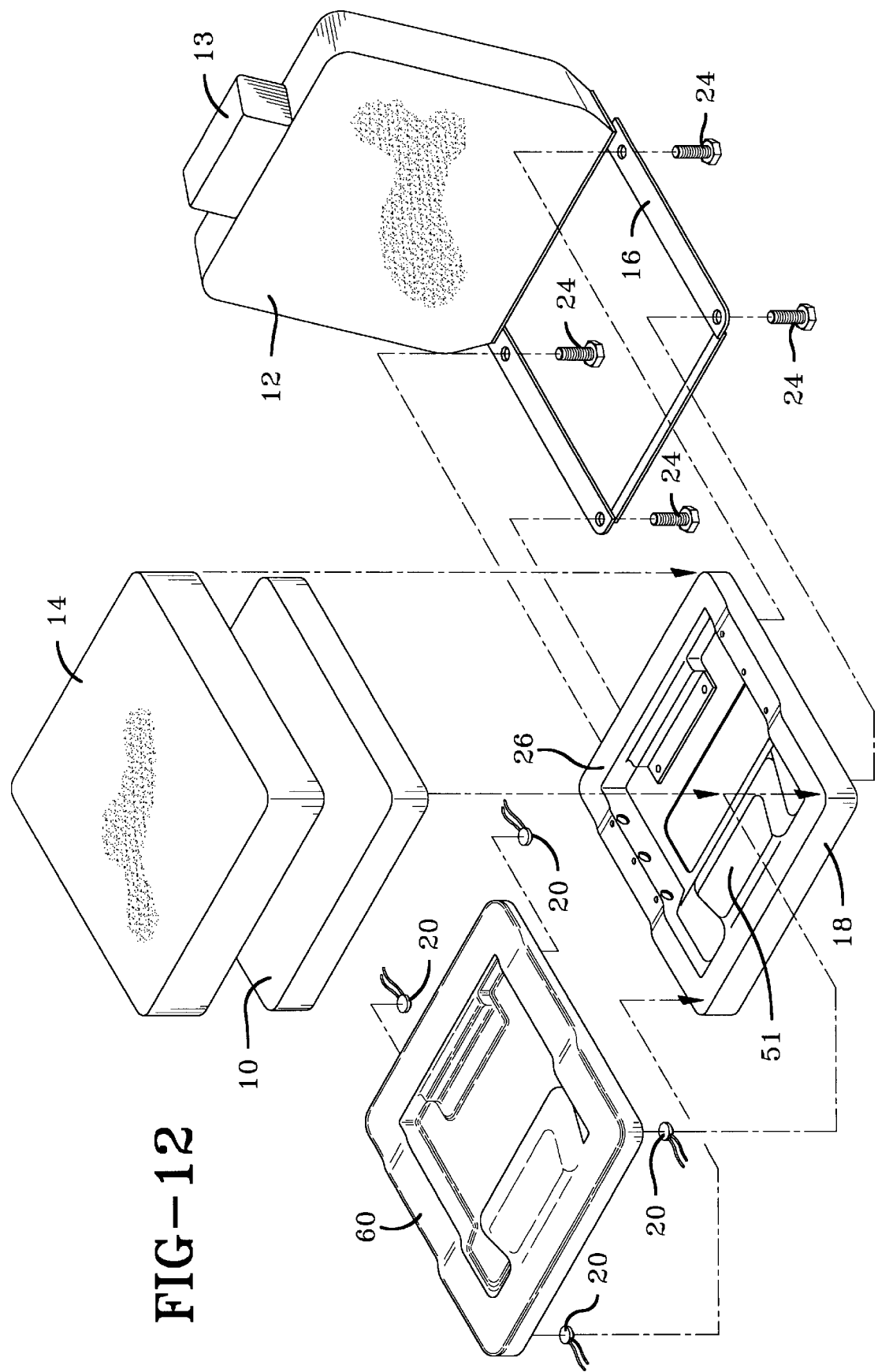
FIG. 12 is an exploded isometric view of an alternative embodiment vehicle seat equipped with an occupant sensing apparatus in accordance with the present invention.

With some car seat designs a seat frame is not part of the structure of the seat. As shown in FIG. 12, a fiberglass tray 60 can be placed above the seat pan 16. The fiberglass tray 60 thus forms the seat frame and transmits substantially all the load imposed on the seat by the seat occupant onto sensors which measure the weight of the occupant. In this way the seat occupant sensing system of this invention can be employed with a wider range of car seats.

Figure 13:
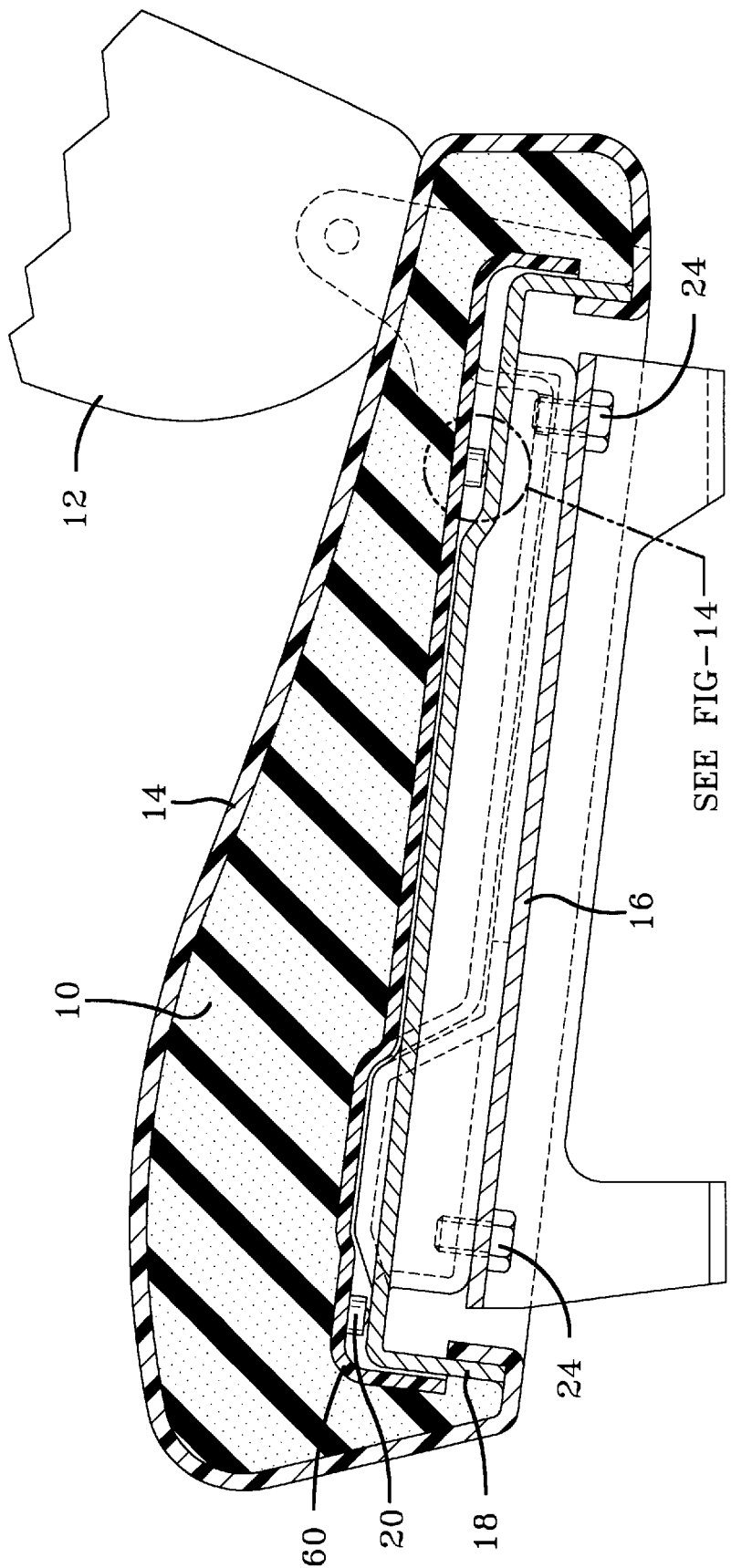
FIG. 13 a cross-sectional side view of the vehicle seat equipped with an occupant sensing apparatus of FIG. 12.
Figure 14:
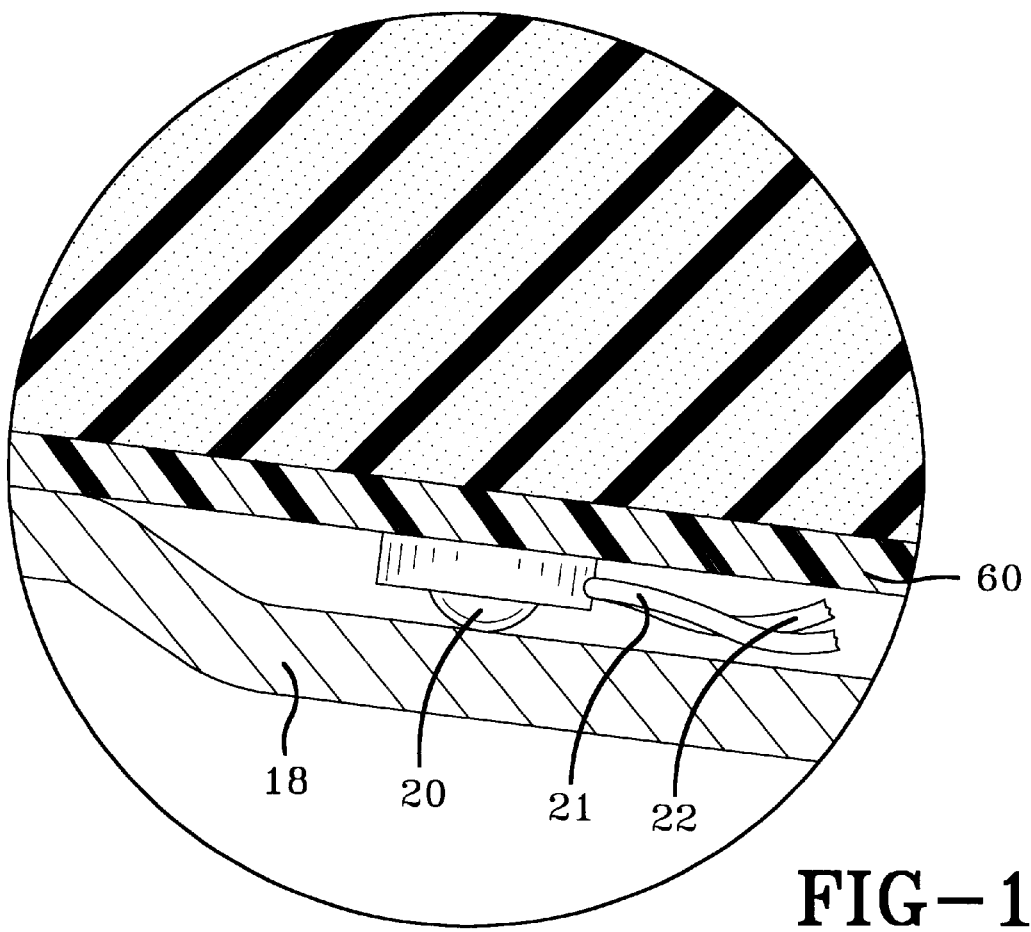
FIG. 14 is an enlarged fragmentary view of a sensor located between rigid components of the alternative vehicle seat design of FIG. 12 which is equipped with an occupant sensing apparatus in accordance with the present invention.

FIGS. 12–14 illustrate how the fiberglass tray 60 substitutes for the frame 19. The fiberglass tray 60 provides a lightweight rigid member which can receive the distributed load imposed by a seat occupant on the cushion 10 and concentrate the distributed load on four points where the sensors 20 can measure the imposed load. The tray 60 requires stiffness, and must be contoured so the seat remains comfortable to the occupant. At the same time the tray must be of relatively low cost and light weight is also a consideration.

Figure 15:
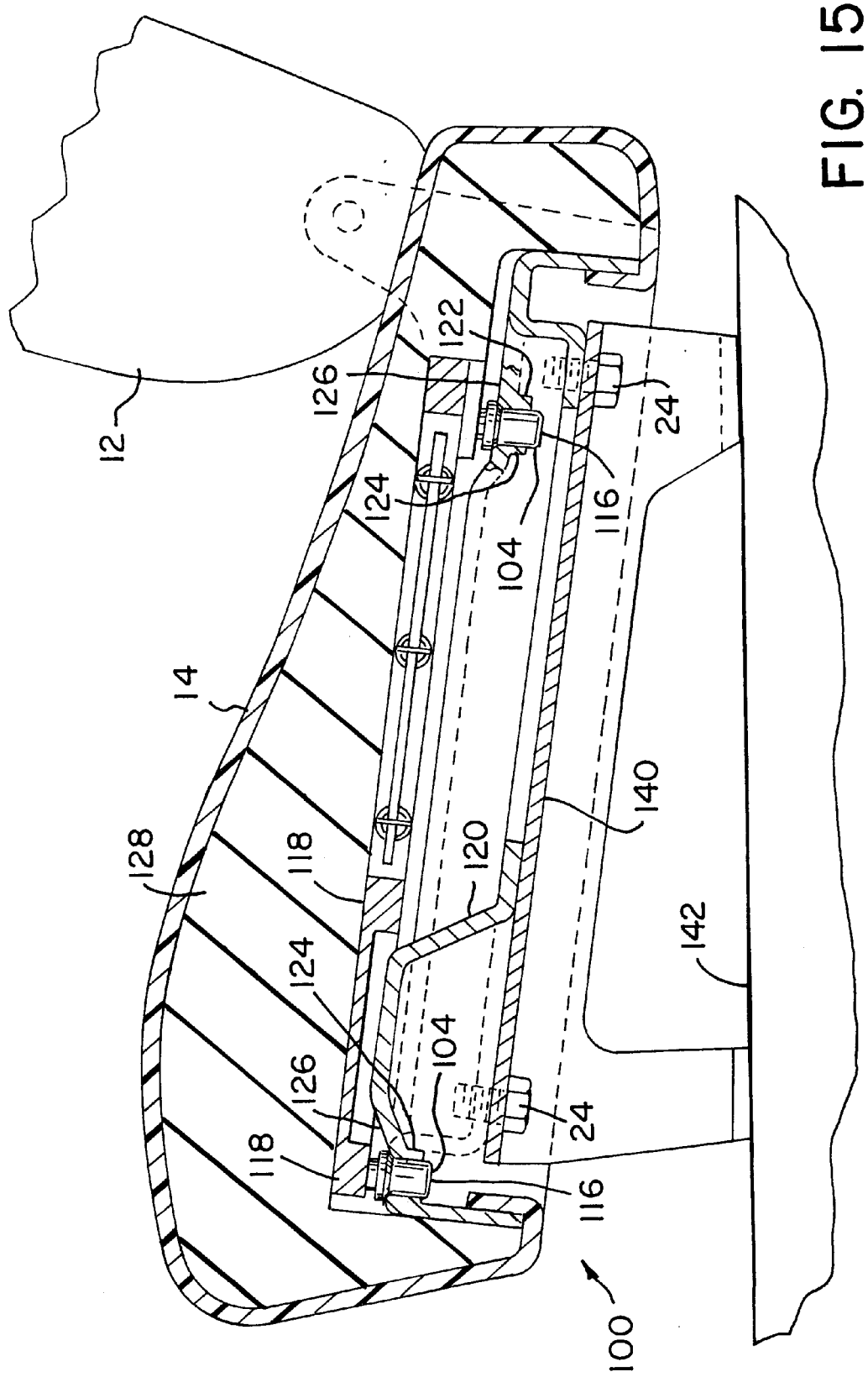
FIG. 15 a cross-sectional side view of a vehicle seat equipped with an alternative embodiment occupant sensing apparatus in accordance with the present invention.
Figure 16:
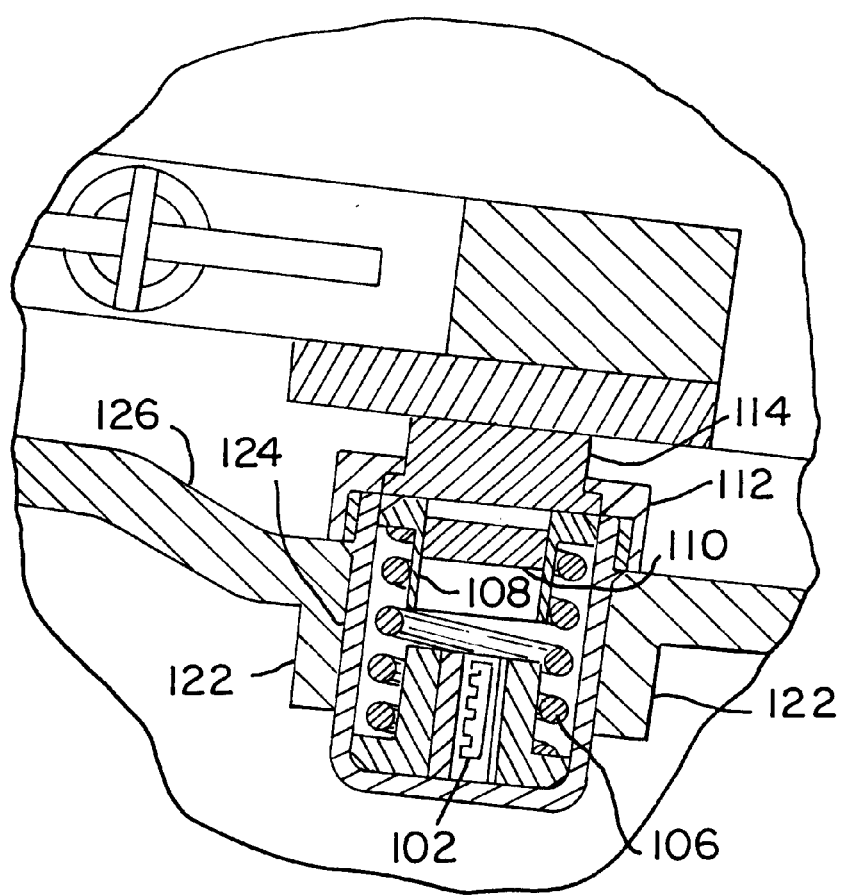
FIG. 16 is an enlarged fragmentary view of a sensor located between rigid components of a vehicle seat equipped with an occupant sensing apparatus in accordance with the present invention.
Figure 17:
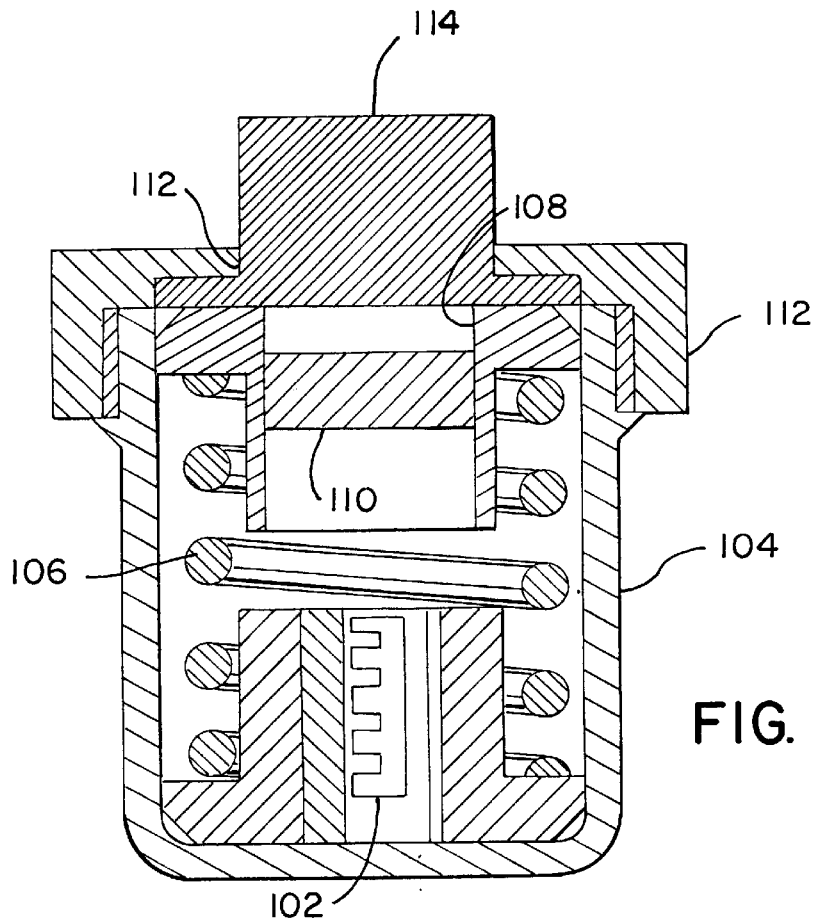
FIG. 17 is a side elevational cross-sectional view of the alternative sensor of FIG. 15.
Figure 18:
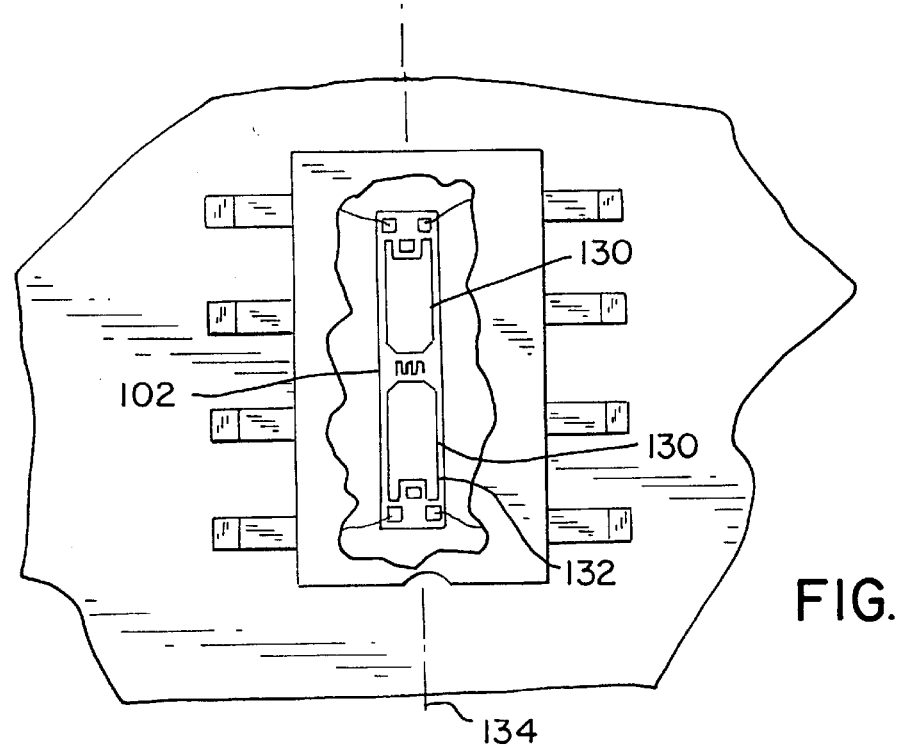
FIG. 18 is a pictorial plan view of a Giant Magnetoresistive (GMR) circuit employed in the sensor of FIG. 17.

An alternative embodiment seat occupant sensing apparatus 100 of this invention, shown in FIG. 15, employs a sensor 102, shown in FIG. 18, which is based on the Giant Magnetoresistive (GMR) effect. The sensor 102, as shown in FIGS. 15, 16 and 17 is positioned in a housing 104 which contains a spring 106 which supports a plunger 108. The plunger 108 contains a permanent magnet 110 which is held above the GMR sensor 102. A cap 112 retains the plunger 108 and the spring 106 within the housing 104. A button 114 overlies the plunger 108 and extends through an opening in the cap 112. A force transmitted to the button 114 moves the plunger 108 containing the magnet 110 downwardly towards the sensor 102.

The housing 104 and the sensor 102, together with the permanent magnet 110, the plunger 108, the button 114, and the retaining cap 112 form a force measuring sensor 116 which can be installed between a seat frame 118 and a seat pan 120. The seat pan 120, as shown in FIGS. 15 and 16, is slightly modified from the seat pan 18 shown in FIGS. 3 and 8. The seat pan 120 has bosses 122 which reinforce holes 124 formed in the seat pan. The holes 124 are sized to receive the housings 104 of the force measuring sensors 116. The retaining caps 112 support the measuring sensors 116 on the upper surface 126 of the seat pan 120. The seat frame 118 is positioned above the seat pan 120 and engages and is supported on the buttons 114 of four force measuring sensors 116.

The seat pan 120 is mounted to a seat frame 140 which in turn is mounted to the floor 142 of a car or other vehicle. In this way the seat pan 120 is connected to a vehicle (not shown).

The weight of the occupant resting on the seat cushion 128 is supported by the buttons 114 of the force measuring sensors 116. The plungers 108 positioned beneath the buttons 114 cause the deflection of the springs 106 which allow the permanent magnets 110 to move downwardly towards the GMR sensors 102. The amount of downward movement of the permanent magnets 110 is controlled by the spring constant of the springs 106. Thus by the simple expedient of choosing the spring constant of the springs 106, the amount of force required to fully depress the plunger 108 on a force measuring sensor 116 can be set.

The force measuring sensors 116 incorporate GMR sensors 102 which sense static magnetic fields. The sensors 102 do not directly support the measured load and have no physical engagement with any moving or load supporting structure. The GMR sensors 102 utilize an effect discovered in 1988, in which certain thin film devices are able to detect static magnetic fields. GMR sensors utilize resistors built up of thin magnetic film a few nanometers thick separated by equally thin nonmagnetic layers.

A decrease in resistance of between about 10 and 20 percent in the built-up resistors is observed when a magnetic field is applied. The physical explanation for the decrease in resistance is the spin dependence of electron scattering and the spin polarization of conduction electrons in ferromagnetic metals.

The extremely thin adjacent magnetic layers couple antiferromagnetically to each other so that the magnetic moments of each magnetic layer are aligned antiparallel to adjacent magnetic layers. Electrons, spin polarized in one magnetic layer, are likely to be scattered as they move between adjacent layers. Frequent scattering results in high resistance. An external magnetic field overcomes the anti-ferromagnetic coupling and produces parallel alignment of moments in adjacent ferromagnetic layers. This decreases scattering and thus device resistance.

Groups of four resistors based on the GMR technology are arranged in a Wheatstone bridge and two legs of the bridge are shielded from the applied magnetic fields. The other two legs are positioned between the magnetic shields 130 which are shown schematically in FIG. 18. The magnetic shields act as flux concentrators to produce a device of tailored sensitivity to a magnetic flux of a selected intensity. A standard voltage is supplied to the solid state device 132 and a voltage is read out of the device 132 which is predictably related or proportional to the magnetic field to which the device is exposed. The devices have an axis 134 of sensitivity which is produced by the orientation of the magnetic flux shields 130 as shown in FIG. 18.

GMR sensors are available from Nonvolatile Electronics Inc. of 11409 Valley View Rd., Eden Prairie, Minn. GMR sensors are small, highly sensitive devices which have exceptional temperature stability, deliver high signal levels and require very little power and cost less than many competitive devices. All these factors are important in devices used in automobile safety applications.

The force measuring sensors 116 are employed as part of a system for deploying an air bag and will typically be used with an amplifier and microprocessor as shown in FIG. 11. The micro processor will incorporate logic which analyzes data from crash detecting sensors and data indicating the presence and weight of an occupant in the front passenger seat of an automobile and other data which may be relevant from additional sensors and will deploy or not deploy an air bag based on logic and sensor inputs.

It should be understood that sensors which sense loads or displacement can be employed with the seat occupant sensing system of this invention.

It should also be understood that the coil spring shown in the force measuring sensors 116 may employ coils which are round in cross-section or flat and that the size of the cross-section together with the material and the material modulus will control the spring constant. Further, the spring employed in the force measuring sensor 116 could use other types of springs such as Belleville springs, or gas springs.

It should also be understood that the seat frame 140 may incorporate an adjustment mechanism which allows motion of the frame with respect to the car floor or allows motion of the seat pan 120 with respect to the frame 140.

It is understood that the invention is not limited to the particular construction and arrangement of parts herein illustrated and described, but embraces such modified forms thereof as come within the scope of the following claims.

We claim:

1. A seat occupant sensing system comprising:
   (a) a seat pan;
   (b) a rigid member disposed vertically above the seat pan in a spaced apart vertically juxtaposed relationship with the seat pan, the rigid member underlying a portion of a seat cushion; and
   (c) at least two sensors interposed between the rigid member and the seat pan such that all of the force transferred from the rigid member to the seat pan is transferred via the sensors which sense the magnitude of the force transferred therethrough and send signals to a device which processes the signals to determine the weight that the portion of the seat cushion is bearing.

2. A seat occupant sensing system according to claim 1 wherein the rigid member has a generally rectangular shape and a sensor is located in the vicinity of each corner of the rigid member.

3. A seat occupant sensing system according to claim 2 wherein at least one of the sensors is a strain gauge.

4. A seat occupant sensing system according to claim 2 wherein at lest one of the sensors is a load cell.

5. A seat occupant sensing system according to claim 2 wherein at least one of the sensors is a variable resistance pressure sensor.

6. A seat occupant sensing system according to claim 2 wherein each sensor comprises:
   a magnet;
   a magnetic field sensor spaced from the magnet; and
   a means for resiliently resisting displacement of the magnet towards the magnetic field sensor so that the displacement of the magnet is predictably related to the applied force.

7. A seat occupant sensing system according to claim 6 wherein the magnetic field sensor is of the GMR type.

8. A seat occupant sensing system according to claim 1 wherein at least one of the sensors is a strain gauge.

9. A seat occupant sensing system according to claim 1 wherein at least one of the sensors is a load cell.

10. A seat occupant sensing system according to claim 1 wherein each sensor comprises:
    a magnet;
    a magnetic field sensor spaced from the magnet; and
    a means for resiliently resisting displacement of the magnet towards the magnetic field sensor so that the displacement of the magnet is predictably related to the applied force.

11. A seat occupant sensing system according to claim 10 wherein the magnetic field sensor is of the GMR type.

12. A seat occupant sensing system according to claim 1 wherein at least one of the sensors is a variable resistance pressure sensor.

13. A seat occupant sensing system according to claim 1 wherein the rigid member and the seat pan are at least partially retained in the vertically juxtaposed relationship by a tension member.

14. A seat occupant sensing system according to claim 1 wherein the tension member is a sheet material overlying the seat cushion and secured to the seat pan.

15. A seat occupant sensing system comprising:
    (a) a seat having a seat support member and a seat pan member fastened to one another;
    (b) a frame disposed vertically above the seat pan in a spaced apart vertically juxtaposed relationship with the seat pan, the frame underlying a portion of a seat cushion; and
    (c) at least two sensors interposed between the frame and the seat pan such that all of the force transferred from the frame to the seat pan is transferred via the sensors which sense the magnitude of the force transferred therethrough and send signals to a device which processes the signals to determine the weight that the portion of the seat cushion is bearing.

16. A seat occupant sensing system according to claim 15 wherein the system further comprises a controller which processes a signal from the weight determining device to control the activation of at least one safety device for an occupant of the seat based upon the weight.

17. A seat occupant sensing system according to claim 16 wherein the controller controls the activation of an inflatable vehicle occupant restraint.

18. A seat occupant sensing system according to claim 16 wherein the controller controls the activation of a seat belt pretensioner.

19. A seat occupant sensing system according to claim 16 wherein each sensor comprises:
   a magnet;
   a magnetic field sensor spaced from the magnet; and
   a means for resiliently resisting displacement of the magnet towards the magnetic field sensor so that the displacement of the magnet is predictably related to the applied force.

20. A seat occupant sensing system according to claim 19 wherein the magnetic field sensor is of the GMR type.

21. A seat occupant sensing system comprising:
   (a) a seat having a seat support member and a seat pan member fastened to one another;
   (b) a frame disposed vertically above the seat pan in a spaced apart vertically juxtaposed relationship with the seat pan, the frame underlying a portion of a seat cushion, the portion of the seat cushion being spaced apart from a rear edge of the seat cushion; and
   (c) at least two sensors interposed between the frame and the seat pan such that all of the force transferred from the frame to the seat pan is transferred via the sensors which sense the magnitude of the force transferred therethrough and send signals to a device which processes the signals to determine the weight that the portion of the seat cushion is bearing.

22. A seat occupant sensing system according to claim 21 wherein the frame has a generally rectangular shape and a sensor is located in the vicinity of each corner of the frame.

23. A seat occupant sensing system according to claim 21 wherein each sensor comprises:
   a magnet;
   a magnetic field sensor spaced from the magnet; and
   a means for resiliently resisting displacement of the magnet towards the magnetic field sensor so that the displacement of the magnet is predictably related to the applied force.

24. A seat occupant sensing system according to claim 23 wherein the magnetic field sensor is of the GMR type.

25. A seat occupant sensing system comprising:
   (a) a seat having a seat support member and a seat pan member fastened to one another;
   (b) a frame disposed vertically above the seat pan in a spaced apart vertically juxtaposed relationship with the seat pan, the frame underlying a portion of a seat cushion, the frame and the seat pan being at least partially retained in the vertically juxtaposed relationship by a tension member;
   (c) at least two sensors interposed between the frame and the seat pan such that all of the force transferred from the frame to the seat pan is transferred via the sensors which sense the magnitude of the force transferred therethrough and send signals to a device which processes the signals to determine the weight that the portion of the seat cushion is bearing; and
   (d) a controller which processes a signal from the weight determining device to control the activation of at least one safety device for an occupant of the seat based upon the weight.

26. A seat occupant sensing system according to claim 25 wherein the tension member is a sheet material overlying the seat cushion and secured to the seat pan.

27. A seat occupant sensing system according to claim 25 wherein the controller controls the activation of an inflatable vehicle occupant restraint.

28. A seat occupant sensing system according to claim 25 wherein the controller controls the activation of a seat belt pretensioner.

29. A seat occupant sensing system according to claim 25 wherein the controller controls the activation of an inflatable vehicle occupant restraint and a seat belt pretensioner.

30. A seat occupant sensing system according to claim 25 wherein at least one of the sensors is a strain gauge.

31. A seat occupant sensing system according to claim 25 wherein at least one of the sensors is a load cell.

32. A seat occupant sensing system according to claim 25 wherein each sensor comprises:
   a magnet;
   a magnetic field sensor spaced from the magnet; and
   a means for resiliently resisting displacement of the magnet towards the magnetic field sensor so that the displacement of the magnet is predictably related to the applied force.

33. A seat occupant sensing system according to claim 32 wherein the magnetic field sensor is of the GMR type.

34. A seat occupant sensing system according to claim 25 wherein at least one of the sensors is a variable resistance pressure sensor.

35. A kit for retrofitting a vehicle seat with a seat occupant sensor system comprising:
   a frame having a plurality of sensors mounted thereon in locations which correspond to a vertically uppermost surface of a vehicle seat pan; and
   a device which processes signals from the sensors to determine the weight that is located above and resting upon the frame.

36. A seat occupant weight measuring system and air bag deployment logic comprising:
   a car seat;
   a rigid member incorporated in the seat and positioned to support the weight of an occupant of the car seat;
   a seat pan supported on the vehicle floor and positioned beneath the rigid member in spaced relation;
   a plurality of load measuring sensors positioned between the seat pan and the rigid member; and
   a means for determining whether an air bag should be deployed, wherein each sensor has a signal conducting means connecting each sensor to the means for determining whether an air bag should be deployed.

37. The system of claim 36 wherein the means for determining whether an air bag should be deployed includes a microprocessor.

38. The system of claim 36 wherein the plurality of load measuring sensors are load-cells positioned between and engaging the rigid member and the seat pan.

39. The system of claim 36 wherein each of the plurality of sensors further comprises:
   a housing;
   a magnetic field sensor positioned within the housing;
   a plunger mounted above the magnetic field sensor;
   a magnet mounted to the plunger and positioned above the magnetic field sensor; and
   a spring positioned to bias the plunger and the magnet away from the magnetic field sensor, wherein the housing is mounted to the seat pan, and the plunger engages the rigid member.

40. The system of claim 31 wherein the magnetic field sensor is of the GMR type.

\* \* \* \* \*